(12) United States Patent
Su (10) Patent No.: US 11,403,485 B2
(45) Date of Patent: Aug. 2, 2022

(54) USE OF A SALIENCY MAP TO TRAIN A COLORIZATION ANN

(71) Applicant: KYOCERA DOCUMENT SOLUTIONS INC., Osaka (JP)

(72) Inventor: Dongpei Su, Palos Verdes, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 129 days.

(21) Appl. No.: 17/027,414

(22) Filed: Sep. 21, 2020

(65) Prior Publication Data

US 2022/0092347 A1 Mar. 24, 2022

(51) Int. Cl.
| | |
|---|---|
| *H04N 1/60* | (2006.01) |
| *G06K 9/62* | (2022.01) |
| *G06T 3/40* | (2006.01) |
| *G06T 7/194* | (2017.01) |
| *G06N 3/08* | (2006.01) |
| *H04N 1/62* | (2006.01) |
| *G06V 10/46* | (2022.01) |

(52) U.S. Cl.
CPC ......... *G06K 9/6256* (2013.01); *G06K 9/6262* (2013.01); *G06N 3/08* (2013.01); *G06T 3/4046* (2013.01); *G06T 7/194* (2017.01); *G06V 10/462* (2022.01); *H04N 1/62* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,779,492 B1 | 10/2017 | Gamavi et al. | |
| 9,830,529 B2* | 11/2017 | Jetley | G06N 3/084 |
| 9,978,003 B2* | 5/2018 | Sachs | G06V 40/161 |
| 2017/0351941 A1 | 12/2017 | Mishra et al. | |

(Continued)

OTHER PUBLICATIONS

Zhan, R., et al., "Colorful Image Colorization," retrieved from the internet at <http://richzhang.github.io/colorization/>, printed on Sep. 21, 2020, 6 pages.

(Continued)

*Primary Examiner* — Dung D Tran
(74) *Attorney, Agent, or Firm* — GrowIP Law Group LLC (57) ABSTRACT

Methods and systems for training and utilizing an artificial neural network (ANN) are provided. In an example method, a computing device could receive an input image comprising a plurality of channels and determine a saliency map for the input image. The computing device could also establish at least one of the plurality of channels as a training channel and at least some of the plurality of channels as one or more ground truth channels. Further, the computing device could train an ANN to predict one or more output channels from the one or more training channels, where the training involves computationally updating weights of the ANN based on a loss function that comprises a difference between the one or more output channels and the one or more ground truth channels, and where the difference is computationally biased based on values from the saliency map.

20 Claims, 8 Drawing Sheets
(4 of 8 Drawing Sheet(s) Filed in Color)

(56) References Cited

U.S. PATENT DOCUMENTS

2021/0012189 A1* 1/2021 Wang .................... G06V 10/40

OTHER PUBLICATIONS

Izuka, S., et al., "Let there be Color!: Joint End-to-end Learning of Global and Local Image Priors for Automatic Image Colorization with Simultaneous Classification," retrieved from the internet at <http://iizuka.cs.tsukuba.ac.jp/projects/colorization/en>, printed on Sep. 21, 2020, 5 pages.

Larsson, G., et al., "Learning Representations for Automatic Colorization," University of Chicago, Toyota Tech Inst. at Chicago, Aug. 2017, 29 pages.

* cited by examiner

USE OF A SALIENCY MAP TO TRAIN A COLORIZATION ANN

BACKGROUND

A computing device could perform various image processing techniques to increase the quality of an image. As one example, if the image contains many artifacts, the computing device could clean (e.g., perform de-blocking, ringing noise removal, etc.) the image. As another example, if the image lacks color, the computing device could apply a colorization technique to colorize the image. The computing device could perform such image processing techniques before printing the image or at another time.

SUMMARY

Herein described are techniques and apparatus generally related to utilizing artificial neural networks (ANNs) and machine learning (ML) to improve image processing.

Accordingly, in a first example embodiment, a computer-implemented method is provided. A computing device could receive an input image comprising a plurality of channels. The computing device could determine a saliency map for the input image. The computing device could establish at least one of the plurality of channels as a training channel and at least some of the plurality of channels as one or more ground truth channels. The computing device could train an ANN to predict one or more output channels from the training channel, where the training involves computationally updating weights of the ANN based on a loss function that comprises a difference between the one or more output channels and the one or more ground truth channels, and where the difference is computationally biased based on values from the saliency map. The computing device could provide the trained ANN.

In a second example embodiment, a computing device is provided. The computing device includes one or more processors; and non-transitory data storage. The non-transitory data storage stores at least computer-readable instructions that, when executed by the one or more processors, cause the computing device to perform tasks in accordance with the first example embodiment.

In a third example embodiment, an article of manufacture is provided. The article of manufacture includes non-transitory data storage storing at least computer-readable instructions that, when executed by one or more processors of a computing device, cause the computing device to perform tasks in accordance with the first example embodiment.

In a fourth example embodiment, a computing system may include various means for carrying out each of the operations of the first example embodiment.

Other aspects, embodiments, and implementations will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Introduction

An artificial neural network (ANN) can include a collection of "nodes" or connected units of computation that can loosely model computation. Connected nodes of the ANN can transmit signals between each other; such as numerical values. Each node can receive one or more input signals, weight the input signals, and combine the weighted input signals to generate one or more output signals. A weight of an input signal can be a numerical value that increases or decreases an effect of its input signal on the output signal.

The ANN can have one or more "layers" or groups of nodes including, but not limited to, one or more layers of input nodes, nodes arranged in one or more hidden layers, and one or more layers of output nodes. Intermediate layers that are between an input layer and an output layer can be termed "hidden layers" as these in-between layers are not visible/hidden from entities outside of the ANN. Other example ANN layers include but are not limited to, input layers and output layers that respectively receive inputs from and provide outputs to entities outside of the ANN convolutional layers which convolve (e.g., downsample) their inputs, activation (e.g., RELU) layers which apply an activation function to their inputs, pooling layers which combine their inputs, and fully-connected layers where each node in the fully-connected layer receives all outputs from a previous layer as its inputs.

During training, the ANN can adjust weights within nodes (e.g., via backpropagation) based on a loss function that provides feedback on task performance by the ANN. Once the ANN is deemed to be trained, the trained ANN can be termed a "model" and can generate output predictions based on corresponding inputs. In some cases, training the ANN involves supervised learning. Supervised learning involves having the ANN infer a function to perform one or more tasks from labeled training data consisting of one or more training data items. In some examples, a training data item includes at least an input image and a desired output image that can act to "label" or identify a result of the ANN's execution of the function operating on the input image. The desired output image of the training data item can be termed as a "ground truth" image.

An ANN can be trained with a large number of images (e.g., hundreds, thousands, or even more images) to perform various types of tasks. In one particular example, an ANN could be trained to output colorized versions of colorless images. Such an ANN could may referred to as a "colorization ANN". In practice, a colorization ANN could receive as input a colorless image and then could perform image processing on the colorless image to generate an output that includes a colorized version of the colorless image.

A common problem, however, with colorization ANNs is that they sometimes generate output images that contain desaturated colors. This characteristic may arise if a colorization ANN is trained using standard regression, a technique whose goal is to minimize a total amount of error in predictions made by the colorization ANN. Minimizing the total amount of error may encourage the colorization ANN to calculate pixel-wise averages and thus discourage the colorization ANN from maintaining any extreme pixel values. However, because extreme pixel values generally capture the rich colors/textures in an image, minimizing the total amount of error may cause the colorization ANN to generate "brownish", highly desaturated output images.

A further problem is that colorization ANNs often produce accurate colors for background objects (e.g., green for grass/trees, blue for skies, etc.), but produce "brownish", highly desaturated colors for foreground objects. The characteristic typically arises because, during colorization training, ANNs are often trained with images that have foreground objects occupying only a small percentage of total image area and/or trained with imbalanced training data (e.g., training data that contains many more background objects than foreground objects).

The herein described techniques can be used to solve these technical problems. In particular, the present disclosure provides for the use saliency maps to train a colorization ANN to focus important foreground objects. The use such saliency maps could alleviate the desaturated color issue by computationally "highlighting" pixels in an input image that correspond to foreground objects, thus causing the colorization ANN to maintain extreme pixel values of those foreground objects.

Advantageously, the disclosed approach leverages saliency maps—which have the ability to understand and extract mid-level features in an input image—in order to train a colorization ANN. Using the guidance of such mid-level features allows the colorization ANN to learn how to better differentiate between background pixels and pixels containing relevant, mid-level features and foreground objects of interest. This could result in improved output from the colorization ANN, for example, output images without desaturated colors. Other advantages are also possible.

II. Example Printing Networks and Computing Devices

Figure 1:
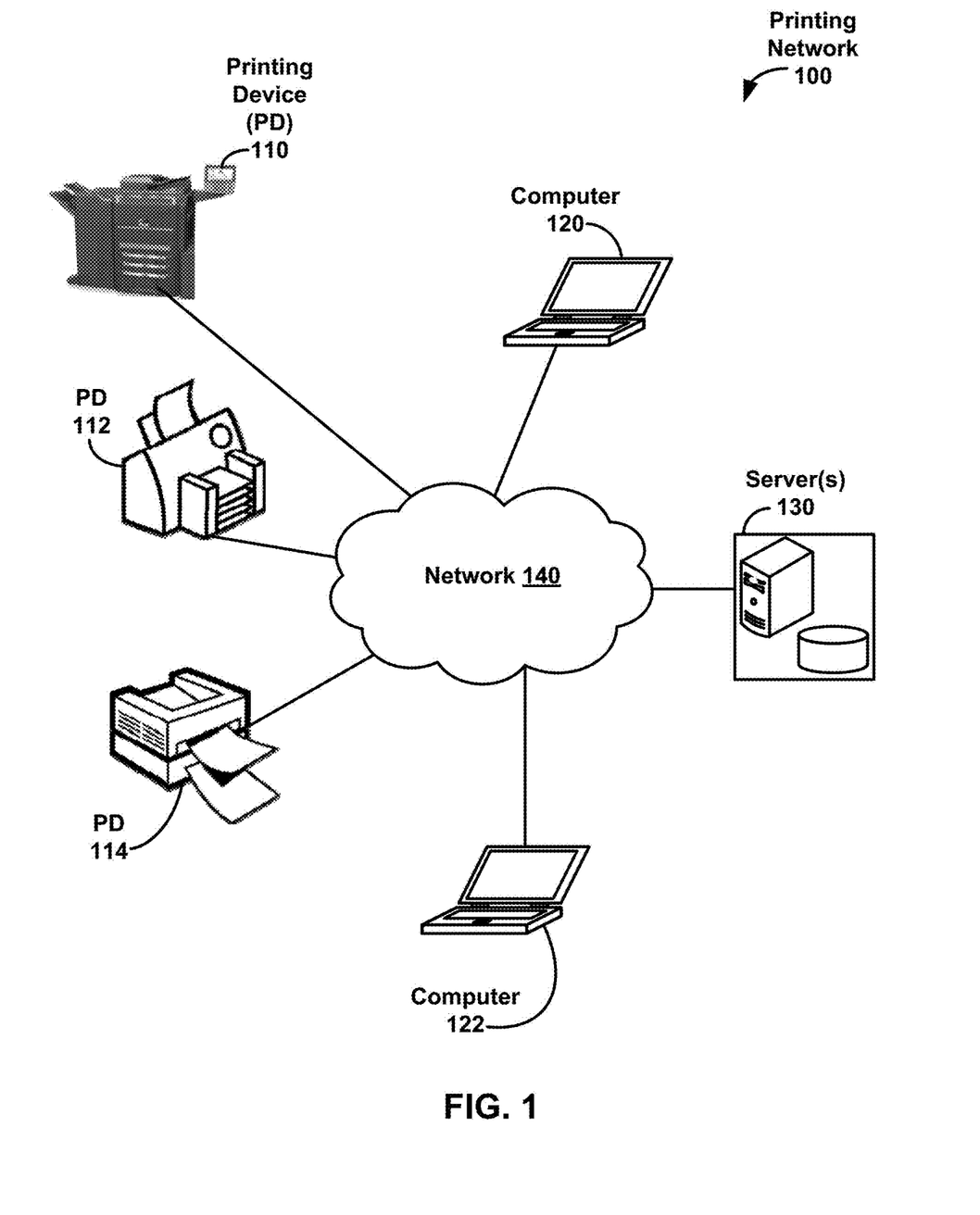
FIG. 1 is a diagram of a printing network, according to example embodiments.

FIG. 1 is a diagram illustrating printing network 100, according to example embodiments. Printing network 100 includes printing devices (PDs) 110, 112, 114, computers 120, 122, and one or more servers 130, all interconnected using network 140. In some examples, printing network 100 can have more, fewer, and/or different types of computing devices, servers, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In example embodiments, some or all printing devices 110, 112, 114 can be connected to network 140 through one or more, possibly different, network protocols. Data can be transmitted between printing devices 110, 112, 114, computers 120, 122, and server(s) 130 over wired and/or wireless links between computers, computing devices, printing devices, servers and network 140. The format of each respective data transmission between devices in printing network 100 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: computers 120, 122, and/or server(s) 130 sending data for print jobs and/or print job portions for printing to printing devices 110, 112, 114 and printing devices 110, 112, 114 sending alert, status, error, device information, colorant-usage information, maintenance-event information, and/or other messages to computers 120, 122, and/or server(s) 130 to inform other devices about colorant-usage, maintenance, error, and/or other conditions of the printing devices; e.g., idle, printing, sleeping, paper jam, low or out of paper, low or out of toner/ink, etc. Other communications between computers 120, 122, and/or server(s) 130 are possible as well, such as, but not limited to, requests to render images using radial gradient coloring and related responses to the requests, are possible as well.

Computers 120, 122 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS), Simple Message Transfer Protocol (SMTP), SNMP, Transfer Control Protocol/Internet Protocol (TCP/IP), User Datagram Protocol (UDP), Lightweight Directory Access Protocol (LDAP), Message Queue (MQ), and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing network 100. In particular, computers 120, 122 can provide displays related to maintaining printing devices, including displays related to colorant usage for printing devices and/or predictions related to colorant usage, where the printing devices can include but are not limited to printing devices 110, 112, 114.

One or more servers 130 can store, update, delete, retrieve, and provide functionality for learning patterns, trends, and/or features about data related to printing network 100, particularly related to printing devices, such as printing devices 110, 112, 114. Based on the learned patterns, trends, and/or features, server(s) 130 can generate outputs, such as predictions about the printing devices including but not limited to predictions of colorant usage by the printing devices. The data stored on server(s) 130 can include device information, colorant-usage information, maintenance-event information, and/or other information related to devices related to printing network 100. The stored data can be retrieved from server(s) 130 in response to a received query (or queries) requesting information about specific device(s), colorant usage, maintenance events, and/or other information.

In some embodiments, server(s) 130 can provide additional services as well (or instead), such as services related to some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 100. For example, server(s) 130 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 100. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, primary identification characteristics and/or model-dependent information about printing devices served by server(s) 130 and perhaps other data.

Figure 2:
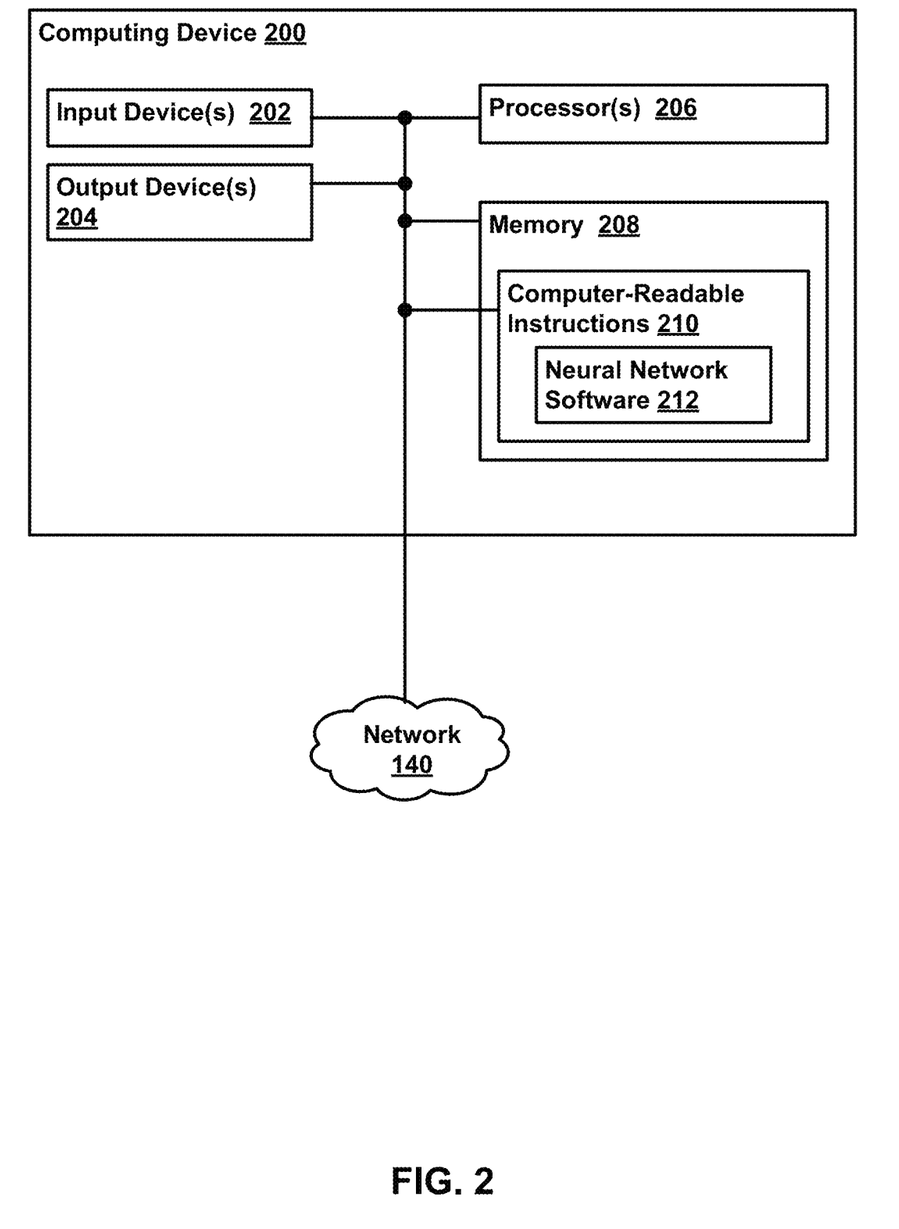
FIG. 2 is a block diagram illustrating a computing device, according to example embodiments.

FIG. 2 is a schematic block diagram illustrating computing device 200, according to example embodiments. Computing device 200 can include one or more input devices 202, one or more output devices 204, one or more processors 206, and memory 208. In some embodiments, computing device 200 can be configured to perform one or more herein-described functions of and/or functions related to: e.g., some or all of at least the functionality described in the context of an artificial neural network, a convolutional neural network, a recurrent neural network, artificial neural networks 400, 500, 700, 750, 1100, pipelines 300 and 600, processes 800 and 1200, and methods 900 and 1300.

Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth™ transceiver, a Zigbee® transceiver, a Wi-Fi™ transceiver, a WiMAX™ transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth™ transceiver, a Zigbee® transceiver, a Wi-Fi™ transceiver, a WiMAX™ transceiver, a WWAN transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), additional graphics-related circuitry/processors, etc.). Processors 206 can be configured to execute computer-readable instructions 210 that are contained in memory 208 and/or other instructions as described herein.

Memory 208 can include one or more computer-readable storage media configured to store data and/or instructions that can be read and/or accessed by at least one of processors 206. The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, some or all of at least the herein-described functionality of devices, networks, methods, diagrams, images, equations, and/or scenarios. In some embodiments, computer-readable instructions 210 can include at least instructions for neural network software 212. Neural network software 212 can include software and/or firmware for providing neural-network-related and/or machine-learning-algorithm-related functionality; e.g., some or all of at least the functionality described in the context of an artificial neural network, a convolutional neural network, a recurrent neural network, machine learning algorithm 340, predictive model 360, networks 400, 500, 700, 750, 1100, 1150, pipelines 600, 800, 1200, and methods 900, 1300.

III. Example Artificial Neural Networks

Figure 3:
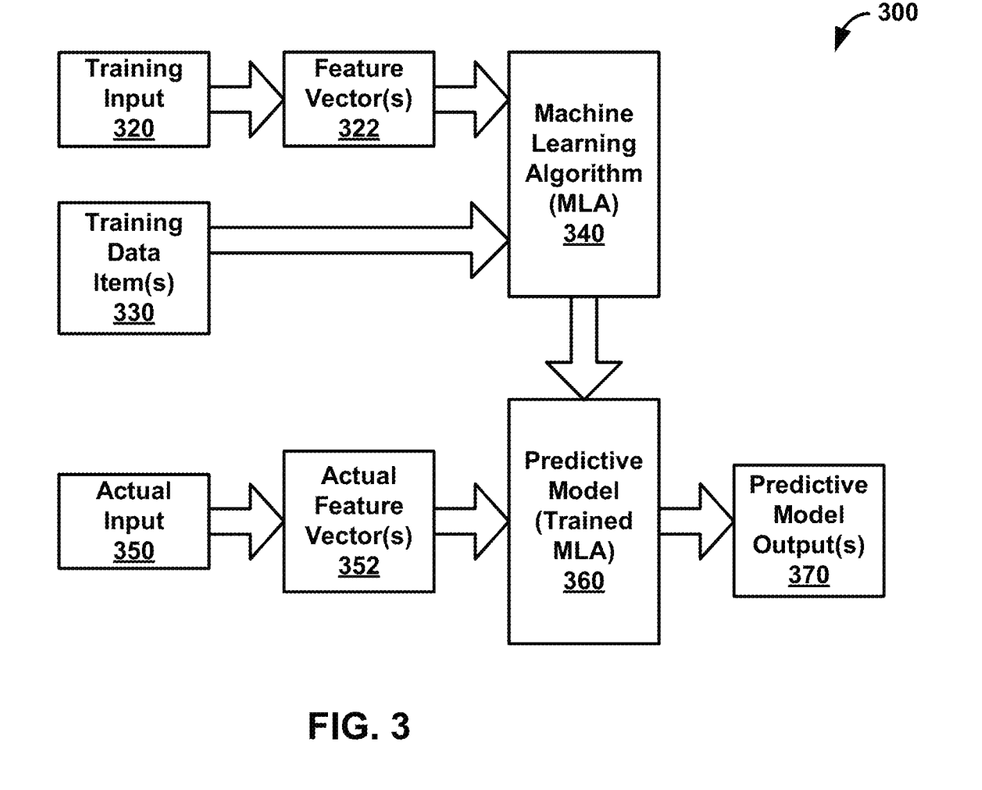
FIG. 3 is a diagram of a supervised learning pipeline, according to example embodiments.

FIG. 3 is a diagram of a supervised learning pipeline 300, according to example embodiments. Supervised learning pipeline 300 includes training input 320, one or more feature vectors 322, one or more training data items 330, machine learning algorithm 340, actual input 350, one or more actual feature vectors 352, predictive model 360, and one or more predictive model outputs 370. Part or all of supervised learning pipeline 300 can be implemented by executing software for part or all of supervised learning pipeline 300 on one or more processing devices and/or by using other circuitry (e.g., specialized hardware for carrying out part or all of supervised learning pipeline 300).

In operation, supervised learning pipeline 300 can involve two phases: a training phase and a prediction phase. The training phase can involve machine learning algorithm 340 learning one or more tasks. The prediction phase can involve predictive model 360, which can be a trained version of machine learning algorithm 340, making predictions to accomplish the one or more tasks. In some examples, machine learning algorithm 340 and/or predictive model 360 can include, but are not limited, to one or more: artificial neural networks (ANNs), deep neural networks, convolutional neural networks (CNNs), recurrent neural networks, support vector machines (SVMs), Bayesian networks, genetic algorithms, linear classifiers, non-linear classifiers, algorithms based on kernel methods, logistic regression algorithms, linear discriminant analysis algorithms, and/or principal components analysis algorithms.

During the training phase of supervised learning pipeline 300, training input 320 can be processed to determine one or more feature vectors 322. In some examples, training input 320 can be preprocessed; e.g., for colorization tasks.

In some examples, some or all of training input 320 includes one or more images. The images could include, for example, images collected by a printing device provider that exhibit known issues, such as resolution related issues or noise related issues. In some cases, training input 320 can include images collected from web scrapers configured to retrieve images exhibiting known issues from public image datasets or the Internet. In some cases, training input 320 can contain several "normal" images that exhibit no known issues.

Feature vector(s) 322 can be provided to machine learning algorithm 340 to learn one or more tasks. After performing the one or more tasks, machine learning algorithm 340 can generate one or more outputs based on feature vector(s) 322 and perhaps training input 320. During training, training data item(s) 330 can be used to make an assessment of the output(s) of machine learning algorithm 340 for accuracy and machine learning algorithm 340 can be updated based on this assessment. Training of machine learning algorithm 340 can continue until machine learning algorithm 340 is considered to be trained to perform the one or more tasks. Once trained, machine learning algorithm 340 can be considered to be a predictive model, such as predictive model 360.

During the prediction phase of supervised learning pipeline 300, actual input 350 can be processed to generate one or more actual feature vectors 352. Actual input 350 can be provided to predictive model 360 via actual feature vector(s) 352. Predictive model 360 can generate one or more outputs, such as predictions, based on actual feature vector(s) 352. The output(s) of predictive model 360 can then be provided as predictive model output(s) 370. In some examples, predictive model 360 can receive a request to make one or more predictions, and reception of the request can trigger predictive model 360 to generate predictive model output(s) 370 based on actual input 350 and/or actual feature vector(s) 352. In some of these examples, the request can include and/or refer to actual input 350.

In some examples, machine learning algorithm 340 can be trained on one or more training computing devices and predictive model 360 can be executed on the same training computing device(s). In some examples, machine learning algorithm 340 can be trained on the training computing device(s). Then, after training, now-trained machine learning algorithm 340 can be communicated as predictive model 360 from the training computing device(s) to one or more other computing devices that can execute predictive model 360 to operate on actual input 350 to generate predictive model output(s) 370.

Figure 4:
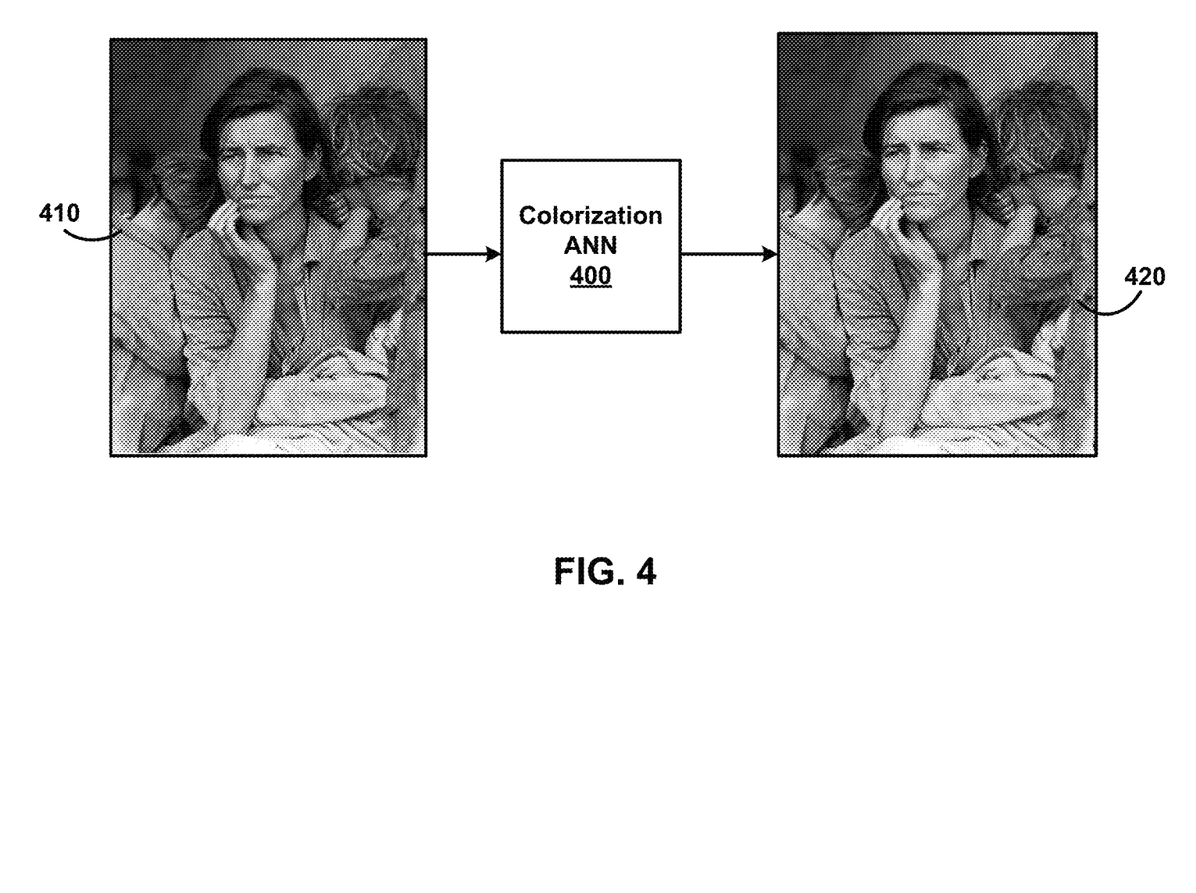
FIG. 4 depicts operations of a colorization ANN, according to example embodiments.

FIG. 4 depicts colorization ANN 400, according to example embodiments. Colorization ANN 400 could be a trained ANN (e.g., a trained machine learning algorithm 340) configured to receive colorless input image 410 and correspondingly generate color image 420, which may be a colorized version of colorless input image 410. In example embodiments, colorization ANN 400 could be trained using supervised learning pipeline 300, as described above in FIG. 3.

In various examples, colorization ANN 400 could take the form of a convolutional neural network (CNN) and could perform convolution, activation, pooling, or inference tasks using a combination of convolution layers, activation layers, pooling layers, and fully connected layers. Generally speaking, a convolution layer includes one or more filters used to filter respective inputs. Each filter works over a subset of an input image or volume. For example, suppose an input to a convolutional layer was a 100×100 pixel image in CMYK format (Z=4). As such, the convolution layer would receive the 100×100×4 volume of pixels as an input volume and would convolve a 3×3×4 filter over the 100×100×4 volume. To do this, the convolution layer would slide the filter across the width and height of the input volume and compute dot products between the entries of the filter and the input at each position that the filter is on the input volume. As the convolution layer slides the filter, the filter generates a 2-dimensional feature map that gives the responses of that filter at every spatial position of the input volume. Multiple such filters could be used in a given convolution layer to produce multiple 2-dimensional feature maps. Further, multiple 2-dimensional feature maps could be combined to form a 3-dimensional feature map.

The output of the convolution layer (e.g., the feature maps mentioned above) can be provided as an input to an activation layer. The activation layer may be applied to determine which values of the feature map are to be provided to a subsequent layer. More generally, the activation layer can determine whether the output of the convolution layer (e.g., the feature map) is to be provided to a subsequent layer. Activation layers could utilize sigmoid/logistic activation functions, hyperbolic tangent activation functions, or rectified linear unit (ReLU) functions, among other possibilities.

In some situations, when making a prediction for an input image, colorization ANN 400 could be configured to minimize a total amount of error across that input image. In line with the discussion above, such a configuration may encourage colorization ANN 400 to calculate pixel-wise averages for the input image and discourage colorization ANN 400 from maintaining any extreme pixel values. However, because extreme pixel values generally capture rich colors/textures, minimizing the total amount error could cause colorization ANN 400 to generate desaturated, "brownish" output images, a color that is the "average" of all possible colors.

Figure 5A:
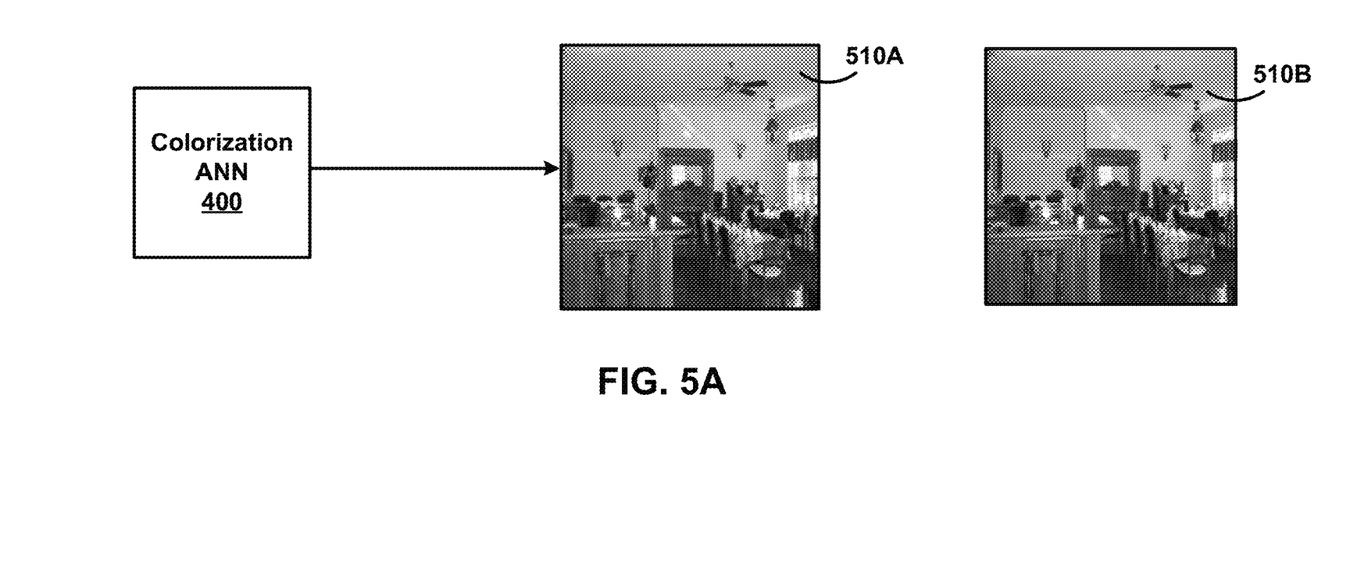
FIGS. 5A-B depict outputs of various colorization ANNs, according to example embodiments.
Figure 5B:
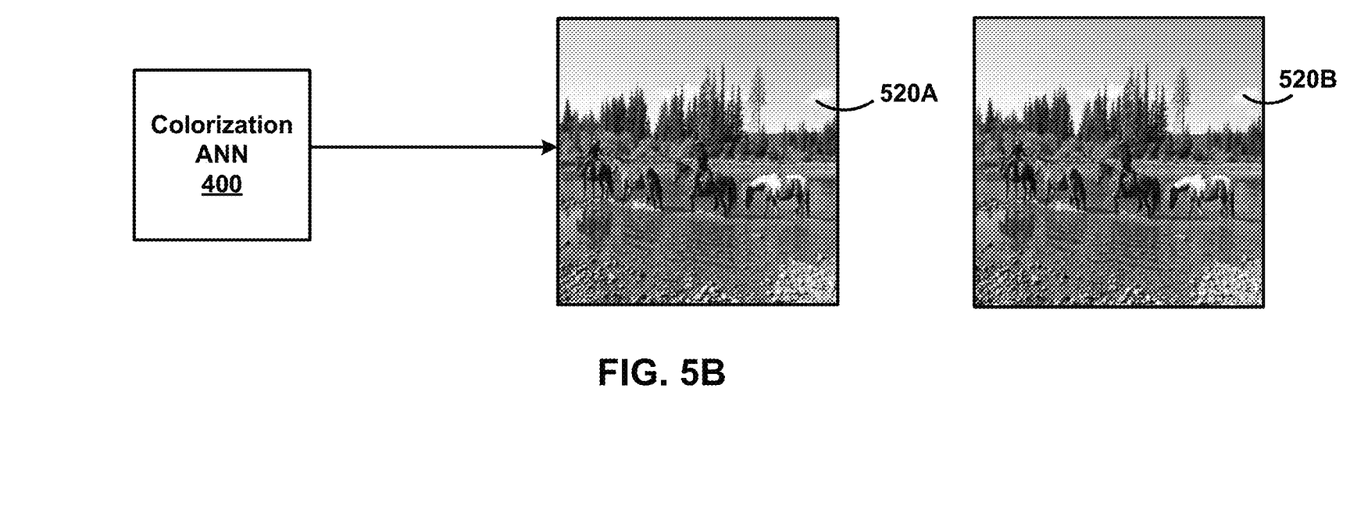

Illustrative examples of such "brownish" output images can be seen in FIGS. 5A and 5B. In particular, FIG. 5A shows how colorization ANN 400 can generate image 510A, which may be a desaturated image of a room. As can be seen by comparing image 510A to image 510B, which may be a saturated image of the same room, image 510B contains a much richer pallet of colors and generally has greater contrast than image 510A. Accordingly, it may be beneficial to configure colorization ANN 400 to generate image 510B rather than image 510A.

Similarly, FIG. 5B shows how colorization ANN 400 can generate image 520A, which may be a desaturated image of a group horses. As can be seen by comparing image 520A to image 520B, which may be a saturated image of the same group of horses, image 520B contains a much richer pallet of colors and generally has greater contrast than image 520A. Accordingly, it may be beneficial to configure colorization ANN 400 to generate image 520B rather than image 520A.

IV. Example Saliency Maps

As described above, one technique for improving the output from a colorization ANN is to utilize a saliency map when training the colorization ANN. Generally speaking, a saliency map is a representation that segments an input image into multiple regions (e.g., sets of pixels) based on the "saliency" of those regions. More particularly, a saliency map may contain respective values for every pixel in an input image, and pixels with similar characteristics may share a similar value. For example, pixels that share the same grey level or color may have a similar value. In theory, the goal of a saliency map is to simplify an input image into a representation that is more meaningful and easier to analyze.

Figure 6A:
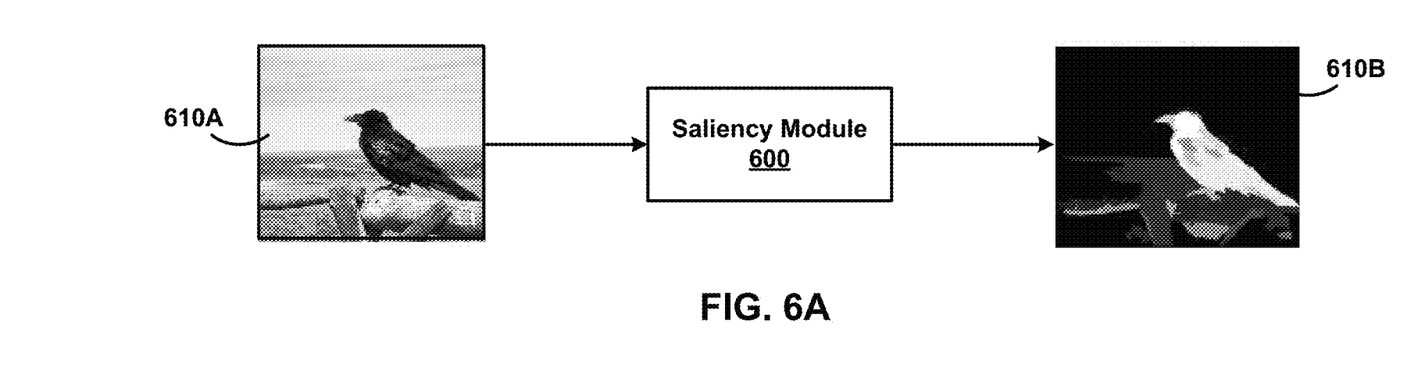
FIGS. 6A-B illustrate various saliency maps, according to example embodiments.
Figure 6B:
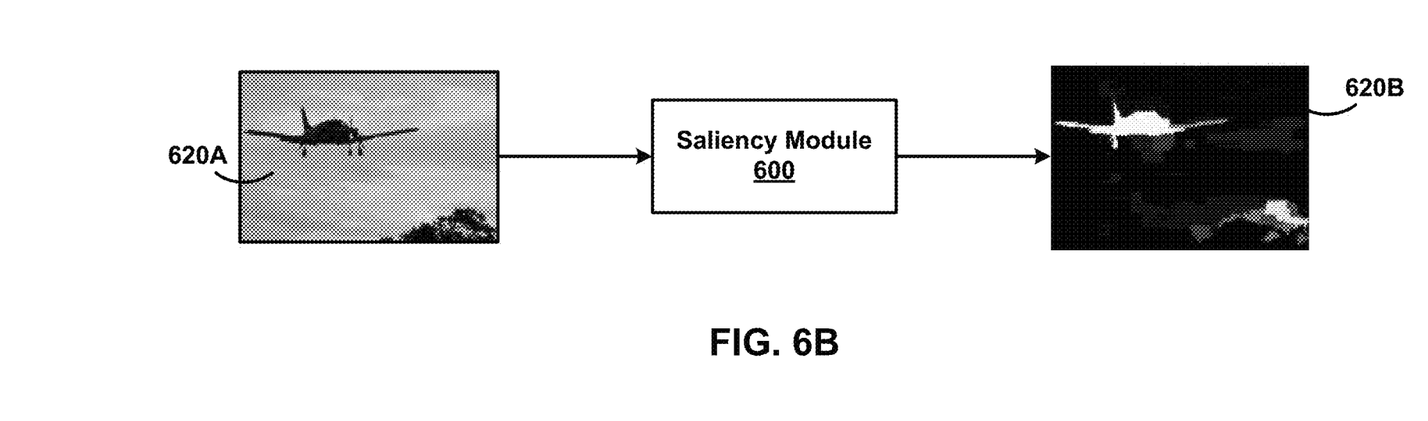

Illustrative examples of saliency maps can be seen in FIGS. 6A and 6B. In particular, FIG. 6A shows how saliency module 600 could receive image 610A, which may be an image of a bird, and correspondingly generate saliency map 610B, which may be a saliency map for image 610A. As shown, saliency map 610B highlights the foreground objects in image 610A. That is, saliency map 610B has darker values for the background regions (e.g., the sky and the ground) of image 610A and has lighter values for the foreground objects (e.g., the bird and the branch) of image 610A. Similarly, FIG. 6B shows how saliency module 600 could receive image 620A, which may be an image of an airplane, and correspondingly generate saliency map 620B, which may be a saliency map for image 620A. As shown, saliency map 620B highlights the foreground objects in image 620A. That is, saliency map 620B has darker values for the background regions (e.g., the sky) of image 620A and has lighter values for the foreground objects (e.g., the airplane and the tree) of image 620A.

Input images into saliency module 600 may be associated with an object class. For example, in FIGS. 6A and 6B, image 610A could be associated with a "bird" object class and image 620A could be associated with an "airplane" object class. During operations, saliency module 600 may determine saliency maps with respect to such object classes. In other words, saliency module 600 may generate a saliency map that visualizes regions within a given input image that have strong effects on the prediction value of a particular object class. In some examples, the object class for an input image corresponds to a foreground object in the input image.

As will be appreciated by those skilled in the art, various techniques could be used to implement the operations of saliency module 600. For instance, one technique may involve saliency module 600 executing at least some functions of the OPENCV© library to generate saliency maps. However, other techniques also exist.

V. Example Image Processing Techniques with Saliency Maps

Figure 7:
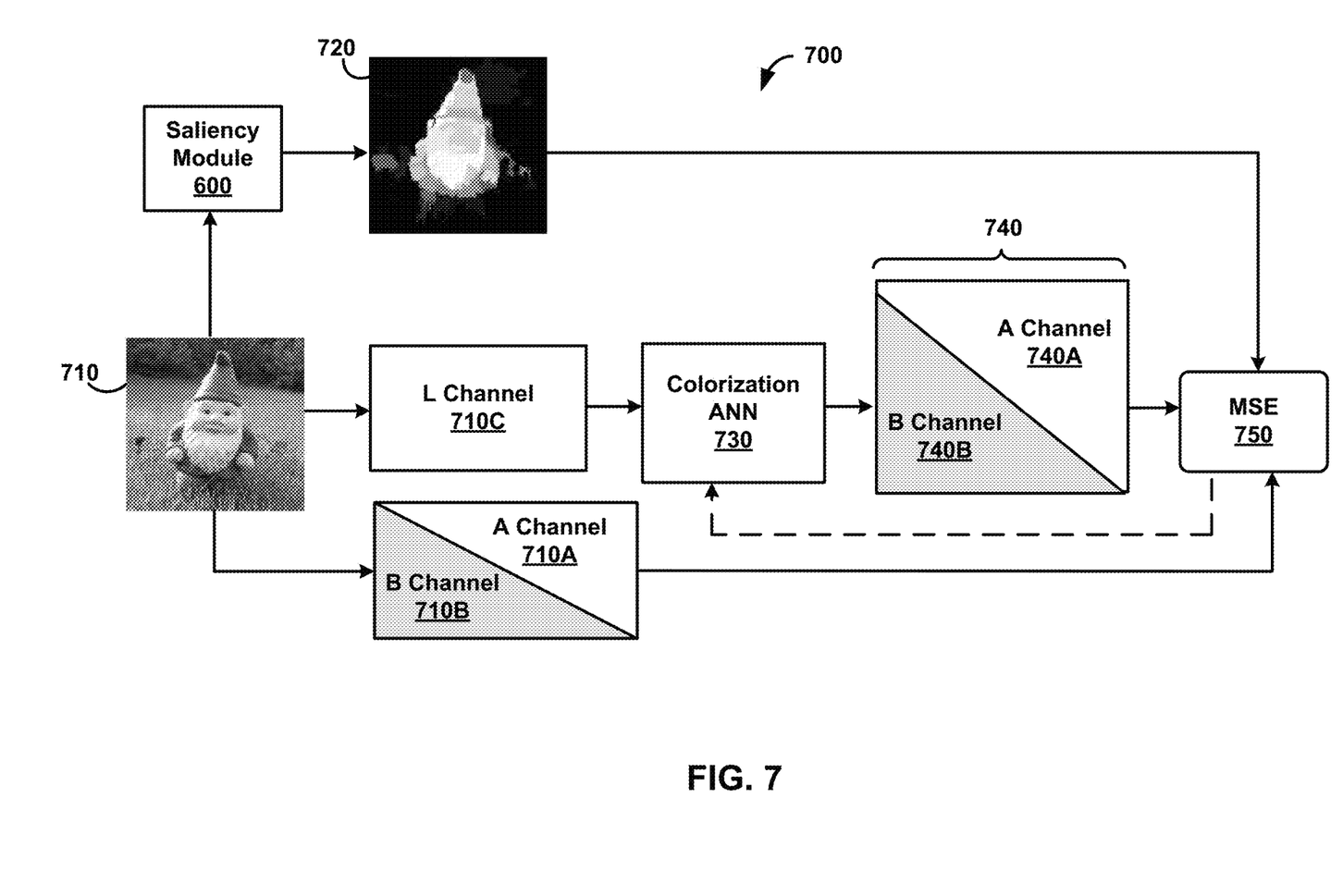
FIG. 7 is a diagram of a process, according to example embodiments.

FIG. 7 is a diagram of process 700, according to example embodiments. Part or all of process 700 can be implemented by executing software for part or all of process 700 on one or more processing devices and/or by using other circuitry (e.g., specialized hardware for carrying out part or all of process 700). Further, part or all of process 700 could be implemented by a printing device, such as printing device 110 described in reference to FIG. 1.

Process 700 may begin with input image 710. As shown in FIG. 7, input image 710 may be formed from three channels: A channel 710A, B channel 710B, and L channel 710C. These channels may correspond to channels from the CIELAB color space. For instance, A channel 710A could be a color channel that captures green-red characteristics (e.g., a*) of input image 710, with negative values indicating green and positive values indicating red. B channel 710B could be a color channel that captures the blue-yellow characteristics (e.g., b*) of input image 710, with negative values indicating blue and positive values indicating yellow. And L channel 710C may be a channel that captures the lightness characteristics (e.g., L*) of input image 710, with the darkest pixels of input image 710 having L*=0, and the brightest pixels of input image 710 having L*=100.

During process 700, L channel 710C may be provided to colorization ANN 730, which could be a CNN configured to receive colorless input images and correspondingly generate colorized versions of the colorless input images. Upon receiving L channel 710C, colorization ANN 730 could perform computations on L channel 710C and correspondingly generate output image 740. Similar to input image 710, output image 740 could be formed from several channels. Namely, output image 740 could be formed from A channel 740A, which may be a color channel that captures predicted green-red characteristics (e.g., a*) for L channel 710C, and B channel 740B, which may be a color channel that captures predicted blue-yellow characteristics (e.g., b*) for L channel 710C. After output image 740 is generated, process 700 could continue with output image 740, A channel 710A, and B channel 710B all being provided to MSE module 750.

Notably, because both A channel 710A and B channel 710B bypass colorization ANN 730, whereas L channel 710C is provided to colorization ANN 730, A channel 710A and B channel 710B could be deemed as "ground truth" channels of input image 710, and L channel 710C could be deemed as a "training channel" for input image 710.

During process 700, input image 710 could also be provided to saliency module 600, which may be a software module that is pre-configured to determine saliency maps for input images. Upon receiving input image 710, saliency module 600 could perform various computations on input image 710 to determine saliency map 720, which may be a saliency map for input image 710. Saliency module 600 could then provide saliency map 720 to MSE module 750.

Upon receiving saliency map 720, A channel 710A, B channel 710B, and output image 740, MSE module 750 may calculate a difference between (i) A channel 710A and A channel 740A of output image 740, and (ii) B channel 710B and B channel 740B of output image 740. In some implementations, the differences calculated by MSE module 750 are pixel-wise differences. That is, pixels in A channel 710A may be compared to corresponding pixels in A channel 740A to determine pixel-wise differences in the A channel. And similarly, pixels in B channel 710B may be compared to corresponding pixels in B channel 740B to determine pixel-wise differences in the B channel. In some embodiments, MSE module 750 could apply computational biases (i.e., mathematical scaling/multiplication) to the pixel-wise differences. Such computational biases could be based on the values from saliency map 720. For instance, for a pixel-wise difference in the A channel, MSE module 750 could apply a computational bias whose value corresponds to the value of a corresponding pixel in saliency map 720. And similarly, for a pixel-wise difference in the B channel, MSE module 750 could apply a computational bias whose value corresponds to the value of a corresponding pixel in saliency map 720.

After determining the pixel-wise differences and applying computational biases to those pixel-wise differences, MSE module 750 could combine the pixel-wise differences in the A and B channels to determine a joint MSE value. In some cases, this may involve applying a scaling factor that sets the amount to which the pixel-wise differences in the A channel and the pixel-wise differences in the B channel contribute to the joint MSE value output by MSE module 750. For example, the scaling factor may be such that the pixel-wise differences in the A channel contribute 30% to the joint MSE value while the pixel-wise differences in the B channel contribute 70% to the joint MSE value. Or, the scaling factor may be such that the pixel-wise differences in the A channel contribute 50% to the joint MSE value while the pixel-wise differences in the B channel contribute 50% to the joint MSE value. Other scaling factors are also possible.

Once the joint MSE value is determined, process 700 can continue by computationally updating the weights (e.g., via back propagation) of colorization ANN 730 based on a loss function that utilizes the joint MSE value determined by MSE module 750.

Process 700 may continue for a plurality of input images. In some embodiments, process 700 may continue until the occurrence of one or more training termination criteria at colorization ANN 730. The training termination criteria can include, but are not limited to, when the error determined by the loss function is less than a predetermined threshold value, the change in the error determined by the loss function is sufficiently small between consecutive iterations of training, or a pre-determined maximum number of iterations has been reached, among other possibilities.

Once colorization ANN 730 is deemed to be trained (e.g., after one or more training termination criteria have been satisfied), the colorization ANN 730 can be termed a "model" and can generate output predictions based on corresponding inputs. At this point, in some implementations, colorization ANN 730 may be provided to a printing device, such as printing device 110 described in reference to FIG. 1. Upon receiving the trained colorization ANN 730, the printing device could use the trained ANN to process an image during one or more printing processes. Alternatively, rather than being provided to the printing device, colorization ANN 730 may be provided to a remote computing device commutatively coupled to the printing device. In such a scenario, the printing device may communicate with the remote computing device to use the services of colorization ANN 730.

VI. Example Operations

Figure 8:
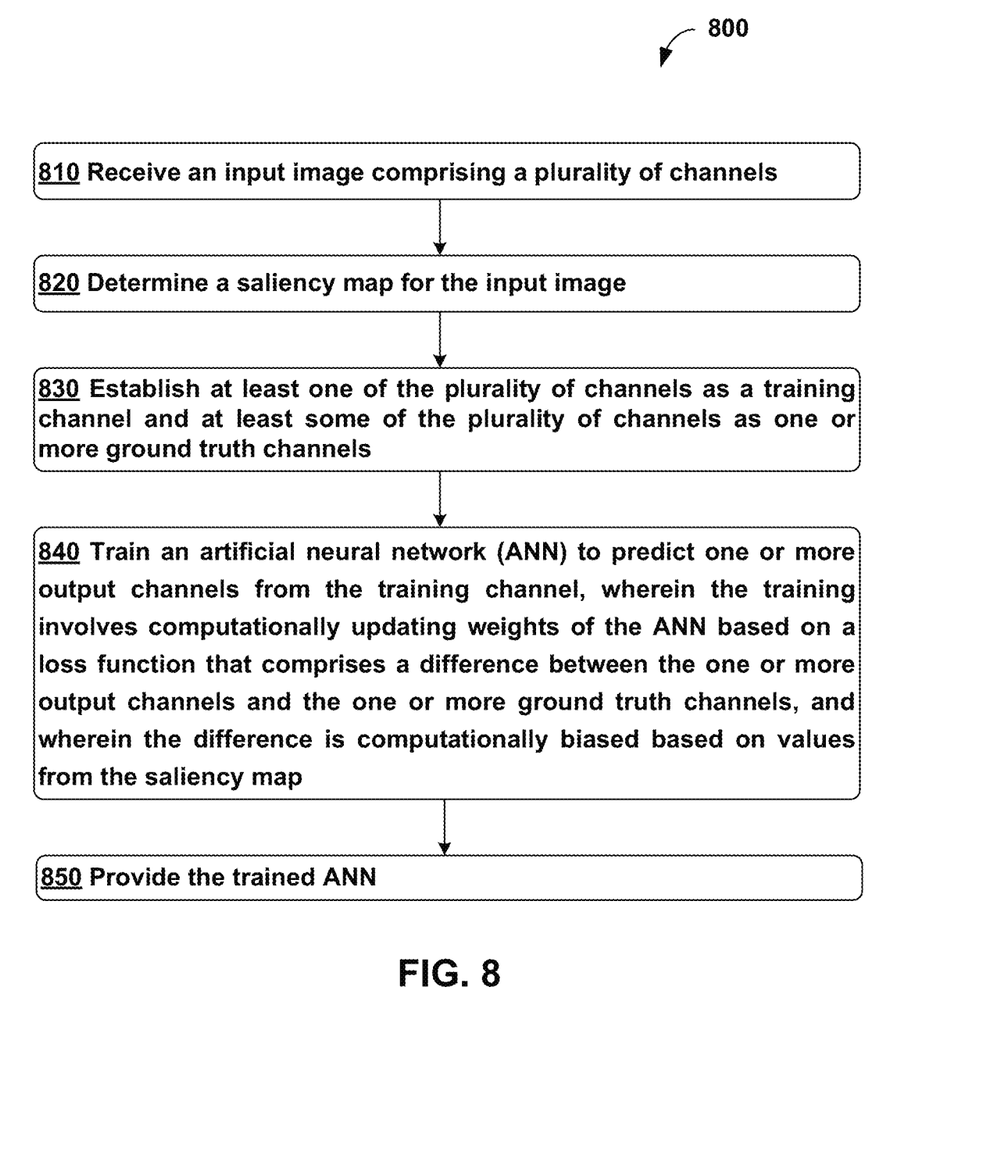
FIG. 8 shows a flowchart for a method, according to example embodiments.

FIG. 8 shows a flowchart for method 800, according to example embodiments. Method 800 can be used for training and utilizing an ANN. Method 800 can be carried out by a computing device, such as computing device 200. However, the process can be carried out by other types of devices or device subsystems. For example, the process could be carried out by a printing device in printing network 100 or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein FIG. 8 shows that method 800 can begin at block 810, where the computing device receives an input image comprising a plurality of channels.

At block 820, the computing device determines a saliency map for the input image.

At block 830, the computing device establishes at least one of the plurality of channels as a training channel and at least some of the plurality of channels as one or more ground truth channels.

At block 840, the computing device trains an ANN to predict one or more output channels from the training channel, where the training involves computationally updating weights of the ANN based on a loss function that comprises a difference between the one or more output channels and the one or more ground truth channels, and where the difference is computationally biased based on values from the saliency map.

At block 850, the computing device provides the trained ANN.

In some embodiments, difference between the one or more output channels and the one or more ground truth channels comprises a pixel-wise difference between the one or more output channels and the one or more ground truth channels.

In some embodiments, the saliency map comprises respective values for each pixel in the input image, and the computational bias involves scaling the pixel-wise difference between the one or more output channels and the one or more ground truth channels by the respective values.

In some embodiments, the input image is associated with at least one object class, and wherein the saliency map is determined with respect to the at least one object class.

In some embodiments, the at least one object class corresponds to at least one foreground object in the input image.

In some embodiments, the input image is part of a plurality of input images, and wherein the receiving, determining, establishing, and training are also applied to each of the plurality of input images.

In some embodiments, the providing comprises providing the trained ANN to a printing device.

In some embodiments, the training channel corresponds to a lightness channel, the one or more ground truth channels correspond to one or more color channels, and the training involves predicting one or more output color channels from the lightness channel.

VII. Conclusion

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
receiving, at a computing device, an input image comprising a plurality of channels;
determining, by the computing device, a saliency map for the input image;
establishing, by the computing device, at least one of the plurality of channels as a training channel and at least some of the plurality of channels as one or more ground truth channels;
training, by the computing device, an artificial neural network (ANN) to predict one or more output channels from the training channel, wherein the training involves computationally updating weights of the ANN based on a loss function that comprises a difference between the one or more output channels and the one or more ground truth channels, and wherein the difference is computationally biased based on values from the saliency map; and providing, using the computing device, the trained ANN.

2. The computer-implemented method of claim 1, wherein the difference between the one or more output channels and the one or more ground truth channels comprises a pixel-wise difference between the one or more output channels and the one or more ground truth channels.

3. The computer-implemented method of claim 2, wherein the saliency map comprises respective values for each pixel in the input image, and wherein the computational bias involves scaling the pixel-wise difference between the one or more output channels and the one or more ground truth channels by the respective values.

4. The computer-implemented method of claim 1, wherein the input image is associated with at least one object class, and wherein the saliency map is determined with respect to the at least one object class.

5. The computer-implemented method of claim 4, wherein the at least one object class corresponds to at least one foreground object in the input image.

6. The computer-implemented method of claim 1, wherein the input image is part of a plurality of input images, and wherein the receiving, determining, establishing, and training are also applied to each of the plurality of input images.

7. The computer-implemented method of claim 1, wherein the providing comprises providing the trained ANN to a printing device.

8. The computer-implemented method of claim 1, wherein the training channel corresponds to a lightness channel, wherein the one or more ground truth channels correspond to one or more color channels, and wherein the training involves predicting one or more output color channels from the lightness channel.

9. A computing device, comprising:
one or more processors; and
non-transitory data storage storing at least computer-readable instructions that, when executed by the one or more processors, cause the computing device to perform operations comprising:
receiving an input image comprising a plurality of channels;
determining a saliency map for the input image;
establishing at least one of the plurality of channels as a training channel and at least some of the plurality of channels as one or more ground truth channels;
training an artificial neural network (ANN) to predict one or more output channels from the training channel, wherein the training involves computationally updating weights of the ANN based on a loss function that comprises a difference between the one or more output channels and the one or more ground truth channels, and wherein the difference is computationally biased based on values from the saliency map; and
providing the trained ANN.

10. The computing device of claim 9, wherein the difference between the one or more output channels and the one or more ground truth channels comprises a pixel-wise difference between the one or more output channels and the one or more ground truth channels.

11. The computing device of claim 10, wherein the saliency map comprises respective values for each pixel in the input image, and wherein the computational bias involves scaling the pixel-wise difference between the one or more output channels and the one or more ground truth channels by the respective values.

12. The computing device of claim 9, wherein the input image is associated with at least one object class, and wherein the saliency map is determined with respect to the at least one object class.

13. The computing device of claim 12, wherein the at least one object class corresponds to at least one foreground object in the input image.

14. The computing device of claim 9, wherein the input image is part of a plurality of input images, and wherein the receiving, determining, establishing, and training are also applied to each of the plurality of input images.

15. The computing device of claim 9, wherein the providing comprises providing the trained ANN to a printing device.

16. The computing device of claim 9, wherein the training channel corresponds to a lightness channel, wherein the one or more ground truth channels correspond to one or more color channels, wherein the training involves predicting one or more output color channels from the lightness channel.

17. An article of manufacture comprising non-transitory data storage storing at least computer-readable instructions that, when executed by one or more processors of a computing device, cause the computing device to perform operations comprising:
receiving an input image comprising a plurality of channels;
determining a saliency map for the input image;
establishing at least one of the plurality of channels as a training channel and at least some of the plurality of channels as one or more ground truth channels;
training an artificial neural network (ANN) to predict one or more output channels from the training channel, wherein the training involves computationally updating weights of the ANN based on a loss function that comprises a difference between the one or more output channels and the one or more ground truth channels, and wherein the difference is computationally biased based on values from the saliency map; and
providing the trained ANN.

18. The article of manufacture of claim 17, wherein the difference between the one or more output channels and the one or more ground truth channels comprises a pixel-wise difference between the one or more output channels and the one or more ground truth channels.

19. The article of manufacture of claim 18, wherein the saliency map comprises respective values for each pixel in the input image, and wherein the computational bias involves scaling the pixel-wise difference between the one or more output channels and the one or more ground truth channels by the respective values.

20. The article of manufacture of claim 17, wherein the input image is associated with at least one object class, and wherein the saliency map is determined with respect to the at least one object class.

* * * * *